Jan. 26, 1965  B. S. APPLETON ETAL  3,167,323
SEAL CONSTRUCTION
Filed April 13, 1962
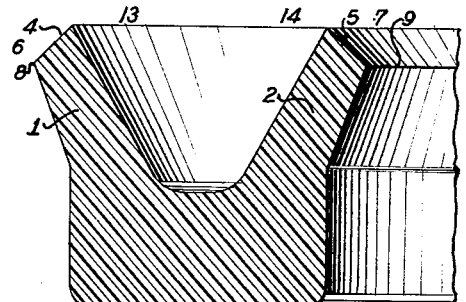
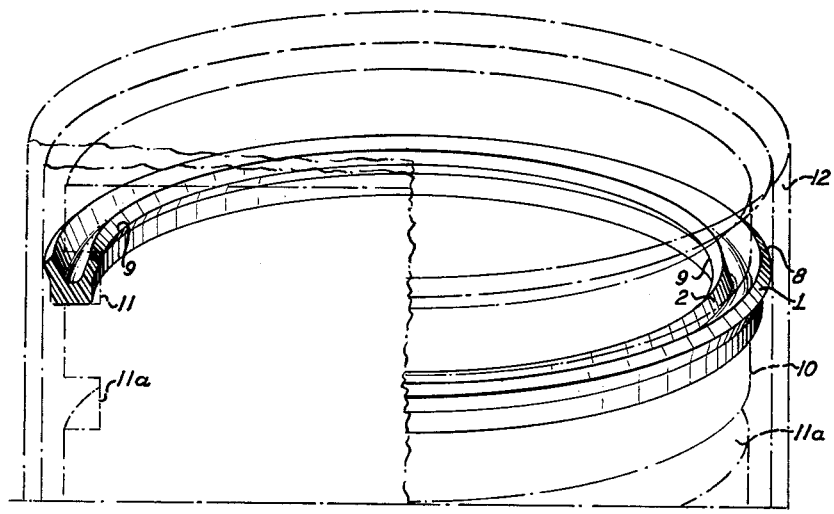
INVENTORS
*BERNARD S. APPLETON
HEINZ VALENTIN WALTER*
BY
ATTORNEYS 3,167,323
SEAL CONSTRUCTION
Bernard S. Appleton, Woodmere, and Heinz Valentin Walter, New Rochelle, N.Y., assignors to Disogrin Industries, a division of Pellon Corporation, Mount Vernon, N.Y., a corporation of New York
Filed Apr. 13, 1962, Ser. No. 187,292
10 Claims. (Cl. 277—205)

This invention relates to an improved seal construction. The invention more particularly relates to an improved construction for a seal for fluids of the type having a flexible side wall with a sealing lip adapted to be pressed by fluid pressure in sealing engagement with a surface, such as a sealing ring or cup of substantially U-shaped cross-sectional configuration.

Seals for fluid, such as sealing rings for pistons, packings for shafts, flanges and the like, having a flexible, side wall with a sealing lip adapted to be pressed by the fluid pressure in sealing engagement with a surface, are well known and widely used. These seals are generally constructed of resilient and elastic material and are positioned between the surfaces where the seal is to be effected, such as between a piston and the adjacent cylinder wall. The sealing lip, due to its inherent elasticity, pressed in sealing engagement with the surface against which the seal is to be effected and faces the pressure side, so that fluid pressure will act thereon and tend to press the same in further, tighter sealing engagement.

In such seals the side wall was generally so constructed that the sealing edge of the sealing lip was defined at its free end which faced the pressure side of the system during operation. It was normally believed that the effect of the pressure to aid in the sealing and the natural elastic characteristics of the material could be best utilized for the sealing effect with this positioning.

In operation, however, it was found that this type of seal was often prone to leakage and failure, and that it was not uncommon for the pressurized fluid against which the seal was provided to channel behind the lip, moving the same from its sealing position and causing leakage. Attempts to correct such leakage by increasing the mechanical force by which the sealing edge of the lip was pressed in sealing engagement with the adjacent surface, such as with the use of additional rings or springs, did not prove successful and would often considerably increase the friction between a seal and the surface which it contacted, causing considerable wear.

One object of this invention is a novel construction for a seal of the above-mentioned type which avoids these disadvantages and which provides a much more reliable sealing effect without a corresponding increase in friction and wear. This and still further objects will become apparent from the following description read in conjunction with the drawings in which:

FIG. 1 is a cross-sectional view of an embodiment of a sealing ring in accordance with the invention; and FIG. 2 is a perspective view diagrammatically showing the sealing ring of FIG. 1 in place on a piston.

The improved seal construction in accordance with the invention is based on the novel combination of the use of a specific elastic material, which a specific construction and geometry of the sealing lip and the sealing edge defined thereby.

The flexible seal, an accordance with the invention, has its sealing lip beveled at an obtuse angle with respect to the sealing wall, forming the sealing edge at the apex of this angle. The seal, or at least its side wall, is formed of a polyurethane having a tensile strength of at least about 4500 and preferably at least about 5000, and most preferably between about 5000 and 5500 lbs. per sq. in.; an elongation at break of at least about 400% and preferably at least about 475%, and more preferably between 475 and 575%; a modulus of elasticity in pounds per square inch between about 1000 and 2000 and most preferably between 1050 and 1700 at 100%, and 2000–3500 and most preferably 2350–3200 at 300%; a tear strength between about 600 and 700 and most preferably 650–675 (ASTM Die C lbs. per inch): a compression modulus at 10% deflection between about 475 and 800 and preferably between about 500–775 lbs. per sq. in., and a hardness (Shore A) between about 85 and 95 and preferably 86–92; all these conditions being measured at about 75° C.

Referring to the embodiment shown in the drawing, the seal is in the form of a sealing ring of a substantially U-shaped, cross-sectional configuration having a flexible outer side wall 1 and a corresponding flexible inner side wall 2 joined by the base 3. The free ends of the side walls 1 and 2 are beveled at 4 and 5 respectively, forming the obtuse angles 6 and 7 respectively with these side walls of preferably between 120 and 150°. The apexes 8 and 9 respectively of these obtuse angles define the sealing edges of the seal.

The entire ring may be constructed of polyurethane having the above described characteristics and may be formed, for example, from the polyurethane by cutting or turning from raw stock or preferably by forming the polyurethane in situ in a mold of the required shape and curing the same, followed by finishing if necessary.

The polyurethane having the above described characteristics may, for example, be formed by reacting the ester of ethylene glycol and adipic acid, such as is sold by the Mobay Chemical Co. under the designation R14, with naphthalene 1,5 diisocyanate, using about 20–30 and preferably 24–27 parts by weight of the isocyanate per hundred parts by weight of the adipate. The adipate ester and the isocyanate may be mixed together in the cold and poured into the mold in a shape corresponding to the shape of the seal to be formed, as for example the seal of FIG. 1, and curing in an oven for 24–40 hours at about 100° C. After curing the molded seal may be removed from the mold and finished, as for example by turning or buffing if necessary.

When increasing the amount of the isocyanate with respect to the ester within the ranges given above, in general the tensile strength and elongation at break decrease within the values given above, while the modulus of elasticity, the elongation at break, the tear strength, compression modulus and hardless, increase within the ranges given above. Thus, when using about 24 parts by weight of the isocyanate per hundred parts by weight of the ester, the tensile strength will be 5500 lbs. per sq. in., elongation at break 575, the modulus of elasticity at 100%, 1050, and at 300%, 2350; tear strength 650, and the compression modulus with 10% deflection, 500, and Shore A hardness 86.

When using, for example, 27 parts by weight of the isocyanate per hundred parts by weight of the ester, the tensile strength is 5000, elongation at break 475, and the modulus of elasticity 1700 at 100°, 3200 at 300°, the tear strength 675, the compression modulus at 10% deflection 775, and the hardness (Shore A) 92.

The seal is used in the conventional manner positioned so that at least one, and preferably both, of the sealing edges 8 and 9 are compressed by the natural elasticity of the material in engagement with the sealing surface against which the seal is to be effected, as for example a piston and/or cylinder surface. The free edges, and thus the open cup-shape of the seal, face in the direction of the pressure, so that the fluid pressure will act against the flexible wall, pressing the sealing edges 8 and/or 9 in firmer sealing contact with the surface against which the seal is to be effected. For example, the seal may be placed around a piston, as shown in FIG. 2, in the ring groove 11, which corresponds in shape to the ring groove 11a (shown without a ring), and positioned in a cylinder 12 so that the sealing edge 8 presses against the wall of the cylinder and the sealing edge 9 against the inner surface of the groove 11. The free ends of the side walls 1 and 2 face in the direction of the compression stroke of the piston, so that the open cup-shape of the ring faces the pressure side. The seal is slightly compressed in place so that the natural elasticity of the material compresses the sealing edges 8 and 9 in sealing engagement with the adjacent surfaces of the piston and cylinder. Due to the particular geometry of the sealing edges, i.e. the formation thereof by the obtuse angles 6 and 7, in combination with the particular polymer of the characteristics given, there is produced a remarkably superior sealing effect.

The seal as formed by the natural elasticity of the material is reliable and trouble-free, without causing excess friction or wear, and very surprisingly the effect of the pressure causes a maximum, optimum increase in the sealing pressure of the sealing edges against the adjacent surfaces.

Normally it might be expected that due to the bevels 4 and 5, the fluid pressure, such as liquid pressure, could get behind the side walls and tend to lift the same. Very surprisingly, however, this pressure acts at a maximum, forcing the edges 8 and 9 away from each other and in firm sealing engagement with the surfaces against which the seal is to be effected. If, however, the bevels 4 and 5 were not provided and if the side walls merely extended in a straight line so that sealing edges were at the ends thereof in the conventional manner, this maximum sealing effect would not be achieved and the particular stress and loading of the elastic material by the pressure would produce an opposing force, tending to lift the sealing edges away from the surfaces against which the seal is to be effected. This component, however, which tends to cause channeling and leakage, is reliably eliminated and the entire loading force utilized for the sealing effect when the particular geometry, as shown, is used in combination with the elastomer of the properties indicated.

The shape of the facing surfaces of side walls 1 and 2 is not critical, and in place of being straight as shown, they may be curved, as shown by the dotted lines at 13 and 14 respectively, or may have any other known or desired shape.

The invention is not only applicable to a "U-cup" type of sealing ring as shown, but to any other sealing member having a flexible side wall with a sealing lip corresponding in cross-sectional shape to either the side wall 1 or 2. Thus the seal may have a side wall corresponding to the side wall 1 but positioned in a separate base or connected to any other type of suitable base member.

While the invention has been described in detail with reference to certain specific embodiments, various changes and modifications which fall within the spirit of the invention and scope of the appended claims will become apparent to the skilled artisan. The invention is therefore only intended to be limited by the appended claims or their equivalent wherein we have endeavored to claim all inherent novelty.

We claim:

1. In a seal for fluids having a flexible side wall with a sealing lip adapted to be pressed by fluid pressure in sealing engagement with a surface, the improvement which comprises said sealing lip being beveled at an obtuse angle with respect to said side wall, forming a sealing edge at the apex of said obtuse angle, said side wall being formed of polyurethane having a tensile strength of at least 4500 lbs. per square inch, an elongation at break of at least 400%, a modulus of elasticity between about 1000 and 2000 lbs. per square inch at 100%, and 2000–3500 lbs. per square inch at 300%, a tear strength between 600–700 lbs. per inch, a compression modulus at 10% deflection between about 475 and 800 lbs. per square inch and a hardness between about 85 and 95.

2. Improvement according to claim 1 in which said obtuse angle is an angle between about 120 and 150°.

3. Improvement according to claim 1 in which said polyurethane has a tensile strength between about 5000–5500 lbs. per square inch, an elongation at break between 475–575%, a modulus of elasticity between 1050–1700 lbs. per square inch at 100% and 2350–3200 lbs. per square inch at 300%, a tear strength between about 650–675 lbs. per inch, a compression modulus of 10% deflection between 500–775 lbs. per square inch, and a hardness between 86 and 92.

4. In a sealing ring for fluid having a flexible outer side wall with a sealing lip adapted to be pressed by fluid pressure in sealing engagement with a surface, the improvement which comprises said sealing lip being beveled at an obtuse angle with respect to said side wall, forming a sealing edge at the apex of said obtuse angle, said side wall being formed of polyurethane having a tensile strength of at least 4500 lbs. per square inch, an elongation at break of at least 400%, a modulus of elasticity between about 1000 and 2000 lbs. per square inch at 100%, and 200–3500 lbs. per square inch at 300%, a tear strength between 600–700 lbs. per inch, a compression modulus at 10% deflection between about 475 and 800 lbs. per square inch and a hardness between about 85 and 95.

5. Improvement according to claim 4 in which said obtuse angle is an angle between about 120 and 150°.

6. Improvement according to claim 4 in which said polyurethane has a tensile strength between about 5000–5500 lbs. per square inch, an elongation at break between 475–575%, a modulus of elasticity between 1050–1700 lbs. per square inch at 100% and 2350–3200 lbs. per square inch at 300%, a tear strength between about 650–675 lbs. per inch, a compression modulus of 10% deflection between 500–775 lbs. per square inch, and a hardness between 86 and 92.

7. In a sealing ring for fluid of substantially U-shaped, cross-sectional configuration having an inner and outer side wall provided with sealing lips adapted to be pressed by fluid in sealing engagement with the surface and joined at their base, the improvement which comprises said sealing lips each being beveled at an obtuse angle with respect to its side wall, forming a sealing edge at the apex of said obtuse angle, said sealing ring being formed of polyurethane having a tensile strength of at least 4500 lbs. per square inch, an elongation at break of at least 400%, a modulus of elasticity between about 1000 and 2000 lbs. per square inch at 100%, and 2000–3500 lbs. per squrae inch at 300%, a tear strength between 600–700 lbs. per inch, a compression modulus at 10% deflection between about 475 and 800 lbs. per square inch and a hardness between about 85 and 95.

8. Improvement according to claim 7 in which said obtuse angle is an angle between about 120 and 150°.

9. Improvement according to claim 7 in which said polyurethane has a tensile strength between about 5000–5500 lbs. per square inch, an elongation at break between 475–575%, a modulus of elasticity between 1050–1700 lbs. per square inch at 100% and 2350–3200 lbs. per square inch at 300%, a tear strength between about 650–675 lbs. per inch, a compression modulus of 10% deflection between 500–775 lbs. per square inch, and a hardness between 86 and 92.

10. Improvement according to claim 9 in which said obtuse angle is an angle between about 120 and 150°.

References Cited by the Examiner

UNITED STATES PATENTS

| | | | |
|---|---|---|---|
| 2,768,407 | 10/52 | Lindermann | 18—48 |
| 2,884,291 | 4/59 | Whitten | 277—205 |
| 2,907,596 | 10/59 | Maha | 277—205 |
| 3,048,414 | 8/62 | Pearce et al. | 277—130 |
| 3,054,627 | 9/62 | Ligon. | |

FOREIGN PATENTS 1,173,682  10/58  France.

EDWARD V. BENHAM, *Primary Examiner.*